(12) United States Patent
Kadam et al.

(10) Patent No.: US 11,697,757 B2
(45) Date of Patent: Jul. 11, 2023

(54) POLYMERIC SWELLABLE SCAVENGERS FOR ACIDIC GASES

(71) Applicant: Halliburton Energy Services, Inc., Houston, TX (US)

(72) Inventors: Sunita Sameer Kadam, Pune (IN); Vaishali Mishra, Karnataka (IN); Mohamed Abdel Salam, Houston, TX (US); Rahul Chandrakant Patil, Pune (IN); Bhau Anantha Kuchik, Pune (IN)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 17/534,015

(22) Filed: Nov. 23, 2021

(65) Prior Publication Data

US 2023/0159813 A1      May 25, 2023

(51) Int. Cl.
*E21B 37/00*      (2006.01)
*C09K 8/54*       (2006.01)
*C09K 8/035*      (2006.01)
*C08F 220/34*     (2006.01)

(52) U.S. Cl.
CPC .............. *C09K 8/54* (2013.01); *C08F 220/34* (2013.01); *C09K 8/035* (2013.01); *E21B 37/00* (2013.01); *C08F 2800/10* (2013.01); *C09K 2208/20* (2013.01); *C09K 2208/32* (2013.01)

(58) Field of Classification Search
CPC ...... C09K 8/54; C09K 8/035; C09K 2208/20; C09K 2208/32; C08F 220/34; C08F 2800/10; E21B 37/00
See application file for complete search history.

(56) References Cited

U.S. PATENT DOCUMENTS

| | | |
|---|---|---|
| 3,301,323 A | 1/1967 | Parsons |
| 3,928,211 A | 12/1975 | Browning et al. |
| 6,746,611 B2 | 6/2004 | Davidson |
| 11,060,374 B2 | 7/2021 | Kadam et al. |
| 2010/0198338 A1 | 8/2010 | Chen et al. |
| 2015/0034319 A1 | 2/2015 | Taylor |
| 2017/0226841 A1 | 8/2017 | Bailey et al. |

(Continued)

FOREIGN PATENT DOCUMENTS

EP      3566762      11/2019

OTHER PUBLICATIONS

Amosa, M. K., I. A. Mohammed, and S. A. Yaro. "Sulphide scavengers in oil and gas industry—a review." Nafta 61.2 (2010): 85-98.

(Continued)

*Primary Examiner* — Silvana C Runyan
(74) *Attorney, Agent, or Firm* — Thomas Rooney; C. Tumey Law Group PLLC

(57) ABSTRACT

Methods for treating fluids used in the production and/or transport of petroleum products and natural gas, and methods for the removal of acidic gases encountered in fluids used and encountered in such operations are provided. In one embodiment, the methods include introducing a treatment fluid including a polymeric swellable acid scavenger that includes at least one polymeric composition into a wellbore penetrating at least a portion of a subterranean formation in which an acidic gas, an acid-containing fluid, or both, are present.

20 Claims, 2 Drawing Sheets

(56) References Cited

U.S. PATENT DOCUMENTS

2018/0037798 A1\* 2/2018 Mishra .................... C04B 26/06
2018/0119006 A1\* 5/2018 Pangilinan ............. C09K 8/887
2019/0376363 A1\* 12/2019 Kadam ................... E21B 33/12
2020/0131424 A1\* 4/2020 Ravi ........................ C09K 8/44
2020/0332203 A1 10/2020 Gawade et al.
2021/0040814 A1 2/2021 Roback et al.

OTHER PUBLICATIONS

Garverick, Linda, ed. Corrosion in the petrochemical industry. ASM international, 1994.
International Search Report and Written Opinion for Application No. PCT/US2022/040093, dated Nov. 25, 2022.

\* cited by examiner

POLYMERIC SWELLABLE SCAVENGERS FOR ACIDIC GASES

BACKGROUND

The present disclosure relates to methods for treating fluids used in the production and/or transport of petroleum products and natural gas, and to methods for the removal of acidic gases encountered in fluids used and encountered in such operations.

Acidic gases such as carbon dioxide ($CO_2$) and hydrogen sulfide ($H_2S$) are corrosive gases commonly found in oil and gas production operations. For example, fluids in sewage systems, fluids produced from wells, and make-up fluids frequently contain acidic gases. Acidic gases can be highly corrosive to drilling tools, pipelines and equipment used in the production and transportation of oil and gas, and may damage tubing, casings, surface facilities, or other types of wellbore equipment. Contamination with acidic gases can have an adverse effect on the properties of a drilling fluid, for example, fluid rheology and/or pH. Hydrogen sulfide may also cause sulfide scaling, which may restrict flow and form undesirable deposits in the surface facilities.

To control the release of acidic gases, certain scavengers may be used to react with acid-containing species and form products that are nonhazardous and noncorrosive. Certain scavengers may be limited by their cost, reaction conditions and ease of removal from the drilling fluid. This may be particularly problematic when more than one type of acid contamination is present. Furthermore, it may be impractical or prohibited to use certain scavengers in large quantities in certain locations.

BRIEF DESCRIPTION OF THE DRAWINGS

These drawings illustrate certain aspects of some of the embodiments of the present disclosure and should not be used to limit or define the claims.

DESCRIPTION OF CERTAIN EMBODIMENTS

Figure 1:
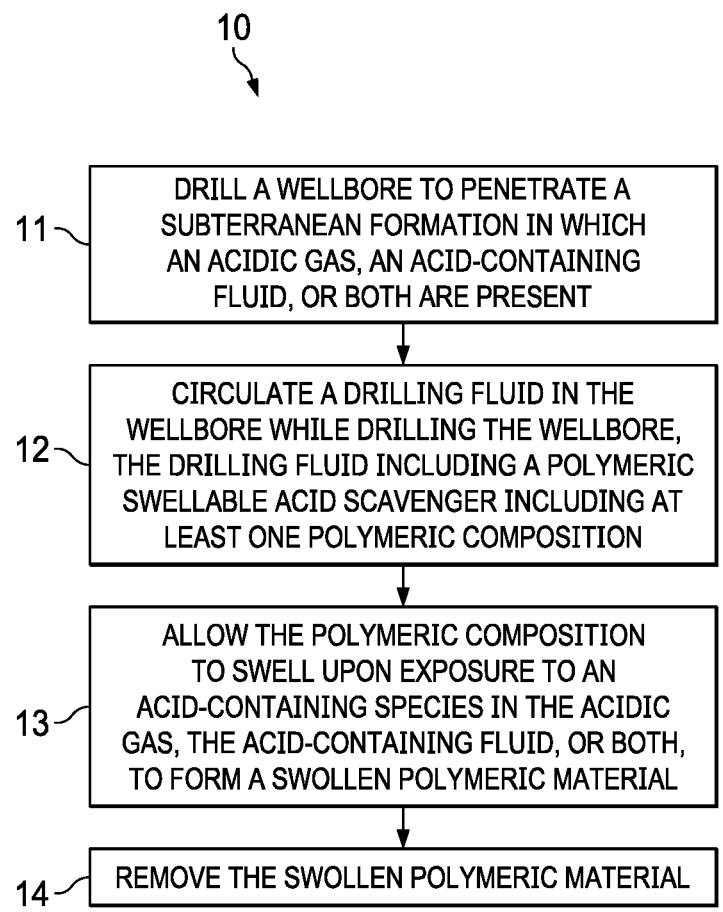
FIG. 1 is a process flow for drilling a wellbore to penetrate a subterranean formation in which an acidic gas, an acid-containing fluid, or both, are present, in accordance with certain embodiments of the present disclosure.

Illustrative embodiments of the present disclosure are described in detail herein. In the interest of clarity, not all features of an actual implementation may be described in this specification. It will of course be appreciated that in the development of any such actual embodiment, numerous implementation-specific decisions may be made to achieve the specific implementation goals, which may vary from one implementation to another. Moreover, it will be appreciated that such a development effort might be complex and time-consuming, but would nevertheless be a routine undertaking for those of ordinary skill in the art having the benefit of the present disclosure.

The present disclosure relates to methods for treating fluids used in the production and/or transport of petroleum products and natural gas, and to methods for the removal of acidic gases encountered in fluids used and encountered in such operations.

More specifically, the present disclosure provides methods for introducing a treatment fluid including a polymeric swellable acid scavenger that includes at least one polymeric composition into a location (e.g., into a wellbore penetrating at least a portion of a subterranean formation) in which an acidic gas, an acid-containing fluid, or both, are present. In some embodiments, the present disclosure provides methods for introducing a treatment fluid including a polymeric swellable acid scavenger that includes at least one polymeric composition into at least a portion of a conduit, a container, or a fluid retention pit in which an acidic gas, an acid-containing fluid, or both are present. In certain embodiments, the present disclosure provides methods for drilling at least a portion of a wellbore to penetrate at least a portion of a subterranean formation in which an acidic gas, an acid-containing fluid, or both, are present, circulating a drilling fluid in at least the portion of the wellbore while drilling at least the portion of the wellbore, the drilling fluid including a polymeric swellable acid scavenger that includes at least one polymeric composition, allowing at least a portion of the polymeric composition to swell upon exposure to at least one acid-containing species in the acidic gas, the acid-containing fluid, or both, to form a swollen polymeric material, and removing the swollen polymeric material.

Among the many advantages to the methods of the present disclosure, only some of which are alluded to herein, the compositions and methods of the present disclosure may, among other benefits, provide for safer, less corrosive, less toxic and/or more efficient removal of acidic gases from a fluid (e.g., a fluid located in a wellbore penetrating at least a portion of a subterranean formation). In certain embodiments, the polymeric swellable acid scavengers of the present disclosure may provide an enhanced ability to scavenge acid-containing species as compared to certain other acid scavengers, at least in part due to the non-discriminatory manner with which the polymeric swellable acid scavengers interact with the acid-containing species. In some embodiments, the polymeric swellable acid scavengers of the present disclosure may provide a polymeric composition of a single polymer that removes both carbon dioxide ($CO_2$) and hydrogen sulfide ($H_2S$). In turn, this may remove the need for multiple products to treat different acidic gases, thus saving cost and time on drilling fluid contamination treatment.

In certain embodiments, the polymeric swellable acid scavengers may interact with the acid-containing species to eliminate or reduce the concentration of acid containing species. In certain embodiments, the polymeric swellable acid scavengers of the present disclosure may provide an enhanced ability to scavenge acid-containing species in oilfield operations where high concentrations of both carbon dioxide ($CO_2$) and hydrogen sulfide ($H_2S$) are present. In some embodiments, the polymeric swellable acid scavengers of the present disclosure may provide more effective scavenging of acid-containing species over a wide variety of temperatures and pressures as compared to certain other acid scavengers. In certain embodiments, the swelling of the polymeric swellable acid scavengers of the present disclosure upon interacting with the acid-containing species may provide for easier removal (e.g. by interacting and removal along with drilled cuttings), as compared to certain other acid scavengers. In certain embodiments, this may reduce operating costs, reduce the cost of chemicals, and/or protect and/or significantly reduce the rate of corrosion of drilling tools.

The polymeric swellable acid scavenger of the present disclosure may be used in a variety of applications and environments in which acid-containing species are present or are expected to be present based on, for example, prior operations and/or other direct or indirect information. Such environments are referred to herein as "potential acid-containing environments". Fluids in potential acid-containing environments that include or are expected to include an acid-containing species are referred to herein as "potential acid-containing fluids." A potential acid-containing fluid may include an acid-containing species that is an acidic gas. Examples of applications suitable for certain embodiments of the present disclosure may include, but are not limited to use in conduits, containers, fluid retention pits, subterranean formations, other portions of refining applications, gas separation towers/applications, transportation pipelines, pipeline treatments, water disposal and/or treatments, and sewage disposal and/or treatments, and/or downhole applications (e.g., drilling, fracturing, completions, oil production). In certain embodiments, the polymeric swellable acid scavenger may be applicable to injection wells, monitoring wells, and/or production wells, including hydrocarbon or geothermal wells and wellbores.

In certain embodiments, the polymeric swellable acid scavenger may be introduced into at least a portion of a conduit, container, fluid retention pit, subterranean formation, wellbore, or other location, wherein one or more acid-containing species are or may be present. In some embodiments, once introduced into a conduit, container, fluid retention pit, subterranean formation, wellbore, or other location, the polymeric swellable acid scavenger may remove one or more acid-containing species, or inhibit, retard, reduce, control, and/or delay the formation of one or more acid-containing species, within the conduit, container, fluid retention pit, subterranean formation, wellbore, or other location. In certain embodiments, the polymeric swellable acid scavenger may interact with the acid-containing species to form nonhazardous and/or noncorrosive products. In some embodiments, the polymeric swellable acid scavenger may be introduced into and/or contact a fluid to be treated. The fluid to be treated may be flowing through, or may be substantially stationary in, the conduit, container, fluid retention pit, subterranean formation, wellbore, or other location. In certain embodiments, the polymeric composition of the polymeric swellable acid scavenger may form a swollen polymeric material upon exposure to one or more acid-containing species.

In certain embodiments, the polymeric swellable acid scavenger may include one or more polymeric compositions. In some embodiments, the polymeric swellable acid scavenger may include a single polymeric composition. In one or more embodiments, the polymeric composition of the polymeric swellable acid scavenger may include at least one monomer and at least one crosslinker. In one or more embodiments, the polymeric composition of the polymeric swellable acid scavenger may include at least one monomer, at least one comonomer, and at least one crosslinker.

The monomer and the comonomer may be acid responsive monomers that include at least one basic functional group and at least one alkene (e.g., a mono-vinyl monomer) or alkyne. The basic functional groups may include, but are not limited to at least one amine, amide, salt thereof, or any combination thereof. The alkene and/or alkyne may be a hydrocarbyl group including one, two, or more unsaturated bonds, such as a diene or an olefin. In some embodiments, the monomer and/or comonomer may also include at least one carbene, such as methylene.

In one or more embodiments, the monomer has the chemical formula:

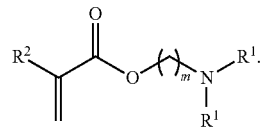

where each $R^1$ and $R^2$ is independently a substituted or unsubstituted linear, branched, cyclic, heterocyclic, or aromatic hydrocarbyl group and m is an integral of 1, 2, 3, 4, 5, 6, 7, 8, 9, or 10. In some examples, each $R^1$ and $R^2$ are independently a $C_1$-$C_{10}$ alkyl and m is an integral in a range from 1 to 8. In other examples, each $R^1$ and $R^2$ are independently a $C_1$-$C_5$ alkyl and m is an integral in a range from 1 to 5. The $C_1$-$C_{10}$ to alkyl may be methyl, ethyl, propyl, butyl, pentyl, hexyl, heptyl, octyl, nonyl, or decyl. In one or more examples, each $R^1$ is independently a $C_1$-$C_{10}$ alkyl, $R^2$ is a substituted or unsubstituted linear, branched, cyclic, heterocyclic, or aromatic hydrocarbyl group, and m is an integral in a range from 1 to 5.

In some examples when m is 2, the monomer includes a dialkylaminoethyl group and the monomer has the chemical formula:

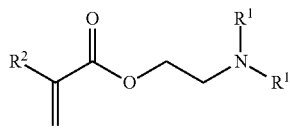

where each $R^1$ is independently a $C_1$-$C_5$ alkyl and $R^2$ is a $C_1$-$C_5$ alkyl, a phenyl, or an aryl. The monomer may include shorter alkyls such that each $R^1$ and $R^2$ is independently a $C_1$-$C_3$ alkyl, such as, methyl, ethyl, or propyl. In a specific example, each $R^1$ and $R^2$ are methyl and the monomer is N,N-dimethylaminoethyl methacrylate (DMAEMA) having the chemical formula:

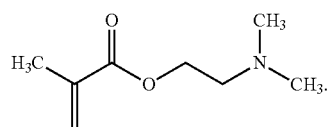

In one or more embodiments, the comonomer may be an alkene or mono-vinyl with the chemical formula $R^3$–CH=CH$_2$, where $R^3$ is a substituted or unsubstituted linear, branched, cyclic, heterocyclic, or aromatic hydrocarbyl group. In one or more examples, $R^3$ is a phenyl, an aryl, or a $C_1$-$C_{10}$ alkyl. For example, $R^3$ is a phenyl and the comonomer is styrene. In other examples, $R^3$ is an aryl and the comonomer is a functionalized styrene.

In some embodiments, each of the monomer and the comonomer may independently be or include, but are not limited to, at least one of alkyl acrylate, alkyl methacrylate, cyclohexyl acrylate, cyclohexyl methacrylate, aryl acrylate, aryl methacrylate, aminoalkyl acrylate, aminoalkyl methacrylate, alkyl vinyl ether, styrene, acrylonitrile, 2-vinyl pyridine, 4-vinyl pyridine, and vinyl acetate, salts thereof, derivatives thereof, or any combination thereof.

The crosslinker may include two or more functional groups for cross-linking with the monomer and/or comonomer. The crosslinker may include one, two, or more alkenes (e.g., mono-vinyl monomers) and/or one, two, or more alkynes. In one or more embodiments, the crosslinker may be or include, but is not limited to, at least one di-vinyl monomer, tri-vinyl monomer, tetra-vinyl monomer, other multi-vinyl monomer or compound, or any combination thereof For example, the crosslinker may be or include, but is not limited to, alkane diol diacrylates, alkane diol dimethacrylates, alkene glycol diacrylates, alkene glycol dimethacrylates, alkane diol divinyl ethers, alkene glycol divinylethers, divinylbenzene, allyl methacrylate, allyl acrylate, triacrylate (trimethylolpropane triacrylate), trimethacrylate (trimethylolpropane trimethacrylate), derivatives thereof, or any combination thereof.

In one or more embodiments, the crosslinker has the chemical formula:

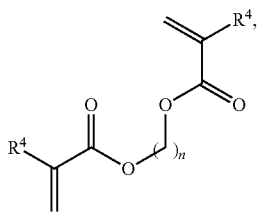

where each $R^4$ is independently a substituted or unsubstituted linear, branched, cyclic, heterocyclic, or aromatic hydrocarbyl group and n is an integral of 1, 2, 3, 4, 5, 6, 7, 8, 9, or 10. In some examples, each $R^4$ is independently a $C_1$-$C_{10}$ alkyl, a phenyl, or an aryl and n is an integral in a range from 1 to 5. In other examples, each $R^4$ is independently a $C_1$-$C_5$ alkyl, a phenyl, or an aryl and n is an integral in a range from 1 to 3.

In some examples when n is 2, the crosslinker includes an ethylene glycol functional group and has the chemical formula:

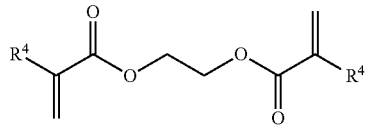

where each $R^4$ is independently a $C_1$-$C_5$ alkyl, a phenyl, or an aryl. The crosslinker may include shorter alkyls such that each $R^4$ is independently a $C_1$-$C_3$ alkyl, such as, methyl, ethyl, or propyl. In a specific example, each $R^4$ is methyl and the crosslinker is ethylene glycol dimethacrylate (EGDMA) having the chemical formula:

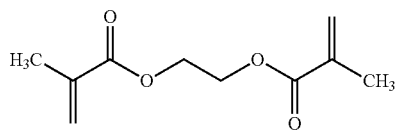

The polymeric composition of the polymeric swellable acid scavenger may include at least the monomer, and the crosslinker. Alternatively, the polymeric composition of the polymeric swellable acid scavenger may include at least the monomer, the comonomer, and the crosslinker. The polymeric composition may include the monomer in an amount of about 50 mol %, about 55 mol %, about 60 mol %, about 65 mol %, or about 70 mol % to about 75 mol %, about 78 mol %, about 80 mol %, about 85 mol %, about 90 mol %, about 95 mol %, about 96 mol %, about 97 mol %, about 98 mol %, about 99 mol %, about 99.5 mol %, or about 99.9 mol %, based on the total moles of the monomer, the comonomer, and the crosslinker. For example, the polymeric composition may include the monomer in an amount of about 50 mol % to about 99 mol %, about 55 mol % to about 98 mol %, about 60 mol % to about 98 mol %, about 65 mol % to about 98 mol %, about 70 mol % to about 98 mol %, about 75 mol % to about 98 mol %, about 78 mol % to about 98 mol %, about 55 mol % to about 90 mol %, about 60 mol % to about 90 mol %, about 65 mol % to about 90 mol %, about 70 mol % to about 90 mol %, about 75 mol % to about 90 mol %, about 80 mol % to about 90 mol %, about 55 mol % to about 85 mol %, about 60 mol % to about 85 mol %, about 65 mol % to about 85 mol %, about 70 mol % to about 85 mol %, about 75 mol % to about 85 mol %, about 78 mol % to about 85 mol %, about 70 mol % to about 80 mol %, about 75 mol % to about 80 mol %, about 75 mol % to about 82 mol %, or about 75 mol % to about 85 mol %, based on the total moles of the monomer, the comonomer, and the crosslinker.

When the comonomer is included in the polymeric composition, the polymeric composition may include the comonomer in an amount of about 5 mol %, about 8 mol %, about 10 mol %, about 12 mol %, or about 15 mol % to about 18 mol %, about 20 mol %, about 25 mol %, about 30 mol %, about 35 mol %, about 40 mol %, or about 50 mol %, based on the total moles of the monomer, the comonomer, and the crosslinker. For example, the polymeric composition may include the comonomer in an amount of about 5 mol % to about 50 mol %, about 10 mol % to about 40 mol %, about 10 mol % to about 35 mol %, about 10 mol % to about 30 mol %, about 10 mol % to about 25 mol %, about 10 mol % to about 20 mol %, about 10 mol % to about 15 mol %, about 12 mol % to about 40 mol %, about 12 mol % to about 35 mol %, about 12 mol % to about 30 mol %, about 12 mol % to about 25 mol %, about 12 mol % to about 20 mol %, about 12 mol % to about 15 mol %, about 15 mol % to about 40 mol %, about 15 mol % to about 35 mol %, about 15 mol % to about 30 mol %, about 15 mol % to about 25 mol %, about 15 mol % to about 20 mol %, or about 15 mol % to about 18 mol %, based on the total moles of the monomer, the comonomer, and the crosslinker.

The polymeric composition may include the crosslinker in an amount of about 0.1 mol %, about 0.5 mol %, about 0.8 mol %, about 1 mol %, or about 1.2 mol % to about 1.5 mol %, about 1.8 mol %, about 2 mol %, about 2.5 mol %, about 3 mol %, about 3.5 mol %, about 4 mol %, about 4.5 mol %, about 5 mol %, about 6 mol %, about 7 mol %, about 8 mol %, about 9 mol %, about 10 mol%, about 11 mol %, about 12 mol %, about 13 mol %, about 14 mol %, or about 15 mol %, based on the total moles of the monomer, the comonomer, and the crosslinker. For example, the polymeric composition may include the crosslinker in an amount of about 0.1 mol % to about 15 mol %, about 0.1 mol % to about 10 mol %, about 0.1 mol % to about 8 mol %, about 0.5 mol % to about 5 mol %, about 0.5 mol % to about 4 mol %, about 0.5 mol % to about 3.5 mol %, about 0.5 mol % to about 3 mol %, about 0.5 mol % to about 2.5 mol %, about 0.5 mol % to about 2.2 mol %, about 0.5 mol % to about 2 mol %, about 0.5 mol % to about 1.5 mol %, about 0.5 mol % to about 1 mol %, about 0.8 mol % to about 10 mol %, about 0.8 mol % to about 6 mol %, about 0.8 mol % to about 4 mol %, about 0.8 mol % to about 3.5 mol %, about 0.8 mol % to about 3 mol %, about 0.8 mol % to about 2.5 mol %, about 0.8 mol % to about 2.2 mol %, about 0.8 mol % to about 2 mol %, about 0.8 mol % to about 1.5 mol %, about 1 mol % to about 15 mol %, about 1 mol % to about 10 mol %, about 1 mol % to about 5 mol %, about 1 mol % to about 4 mol %, about 1 mol % to about 3.5 mol %, about 1 mol % to about 3 mol %, about 1 mol % to about 2.5 mol %, about 1 mol % to about 2.2 mol %, about 1 mol % to about 2 mol %, about 1 mol % to about 1.5 mol %, about 1.5 mol % to about 5 mol %, about 1.5 mol % to about 4 mol %, about 1.5 mol % to about 3.5 mol %, about 1.5 mol % to about 3 mol %, about 1.5 mol % to about 2.5 mol %, about 1.5 mol % to about 2.2 mol %, about 1.5 mol % to about 2 mol %, or about 1.5 mol % to about 1.8 mol %, based on the total moles of the monomer, the comonomer, and the crosslinker.

In one or more examples, the polymeric composition may be produced by reacting together about 92 mol % to about 99.9 mol % of the monomer and about 0.1 mol % to about 8 mol % of the crosslinker. In other examples, the polymeric composition may be produced by reacting together about 95 mol % to about 99 mol % of the monomer and about 1 mol % to about 5 mol % of the crosslinker. In other examples, the polymeric composition may be produced by reacting together about 97 mol % to about 99 mol % of the monomer and about 1 mol % to about 3 mol % of the crosslinker.

In one or more examples, the polymeric composition may be produced by reacting together about 65 mol % to about 90 mol % of the monomer, about 10 mol % to about 30 mol % of the comonomer, and about 0.5 mol % to about 5 mol % of the crosslinker. In other examples, the polymeric composition may be produced by reacting together about 75 mol % to about 82 mol % of the monomer, about 15 mol % to about 25 mol % of the comonomer, and about 1 mol % to about 3 mol % of the crosslinker. In other examples, the polymeric composition may be produced by reacting together about 76 mol % to about 80 mol % of the monomer, about 18 mol % to about 22 mol % of the comonomer, and about 1.5 mol % to about 2.5 mol % of the crosslinker.

The polymeric composition may be produced by reacting the monomer, the crosslinker, and at least one radical initiator. Alternatively, the polymeric composition may be produced by reacting the monomer, the comonomer, the crosslinker, and at least one radical initiator. The radical initiator, or a portion thereof, may be incorporated into the polymeric composition. Alternatively, the radical initiator may remain unincorporated into the polymeric composition. For example, the radical initiator may be or include a catalyst. In one or more examples, the radical initiator may be or include, but is not limited to at least one azo compound, peroxide, persulfate, or any combination thereof. An example radical initiator may be or include, but is not limited to, at least one of azobisisobutyronitrile (AIBN) that has the chemical formula $[(CH_3)_2C(CN)]_2N_2$, benzoyl peroxide, potassium persulfate, salts thereof, or any combination thereof.

The radical initiator may be combined with the monomer and the crosslinker, or the monomer, the comonomer, and the crosslinker, in an amount of about 0.1 mol %, about 0.2 mol %, about 0.3 mol %, about 0.4 mol %, or about 0.5 mol % to about 0.6 mol %, about 0.8 mol %, about 1 mol %, about 1.5 mol %, about 2 mol %, about 2.5 mol %, about 3 mol %, about 4 mol %, about 5 mol %, or more of the radical initiator, based on the total moles of the monomer, the comonomer, and the crosslinker. For example, the radical initiator can be combined with the monomer and the crosslinker, or with the monomer, the comonomer, and the crosslinker, in an amount of about 0.1 mol % to about 5 mol %, about 0.2 mol % to about 5 mol %, about 0.2 mol % to about 4 mol %, about 0.2 mol % to about 3 mol %, about 0.2 mol % to about 2 mol %, about 0.2 mol % to about 1 mol %, about 0.5 mol % to about 5 mol %, about 0.5 mol % to about 4 mol %, about 0.5 mol % to about 3 mol %, about 0.5 mol % to about 2 mol %, about 0.5 mol % to about 1 mol %, about 0.8 mol % to about 4 mol %, about 0.8 mol % to about 3 mol %, about 0.8 mol % to about 2 mol %, or about 0.8 mol % to about 1 mol % of the radical initiator, based on the total moles of the monomer, the comonomer, and the crosslinker.

The polymeric composition may be tuned for a particular application by changing the amount and/or the functional groups included in the monomer, comonomer and/or crosslinker in the polymeric composition.

The acid-containing species of the present disclosure may include any compound or chemical species that can act as a proton donor. In certain embodiments, the acid-containing species of the present disclosure may include any compound or chemical species that increases the concentration of hydrogen ions ($H^+$) in a fluid. In some embodiments, the acid-containing species may be an acidic gas. For example, the acid-containing species may be an acidic gas that is carbon dioxide ($CO_2$) and/or hydrogen sulfide ($H_2S$). Carbon dioxide ($CO_2$) may form carbonic acid ($H_2CO_3$) upon contact with an aqueous fluid. The carbonic acid may further dissociate to form a bicarbonate ion ($HCO_3^-$) and an $H^+$ion. Hydrogen sulfide ($H_2S$) may act as a weak acid in an aqueous fluid and dissociate to give a hydrosulfide ion ($HS^-$) and $H^+$ion.

The polymeric composition may form a swollen polymeric material upon exposure to at least one acid-containing species (e.g., an acidic gas). Without limiting the disclosure to any particular theory or mechanism, it is believed that the $H^+$ions of the acid-containing species interact with an amine group in the polymeric composition. The amine group in the polymeric composition may act as a chemical base and neutralize the acid to form a polymeric salt and water. As the polymeric composition is a cross-linked network, the interaction with the acid-containing species may cause it to swell.

As used herein, the terms "swell," "swellable," or "swollen" mean an increase in volume through molecular incorporation of at least one fluid within a component or material of the polymeric swellable acid scavenger or the polymeric composition. For example, terms used to describe the component or material of the polymeric swellable acid scavenger or the polymeric composition can be or include, but are not limited to, "swellable acid scavenger," "swellable material," "swellable polymeric composition," "swellable polymeric material," "swellable polymer," "swellable elastomer," "swollen packer," or "swollen polymeric material."

In certain embodiments, the polymeric composition of the polymeric swellable acid scavenger will interact with an acid-containing species in a fluid (e.g., acidic gases such as carbon dioxide ($CO_2$) and/or hydrogen sulfide ($H_2S$) in a drilling fluid). In certain embodiments, upon interacting with the acid-containing species, the polymeric composition will swell to form the swollen polymeric material. The swollen polymeric material may be removed from the fluid, for example, by use of solid control equipment. In certain embodiments, the swollen polymeric material will float to the surface. In some embodiments, the swollen polymeric material may be separated along with drilled cuttings. In certain embodiments, the swollen polymeric material may be separated along with drilled cuttings by use of solid control equipment utilized at a drilling location. In some embodiments, the polymeric composition may include a single polymer that removes both carbon dioxide ($CO_2$) and hydrogen sulfide ($H_2S$). In certain embodiments, the polymeric swellable acid scavenger mitigates the risk of acid contamination of the fluid.

FIG. 1 depicts a process flow 10 for certain embodiments of drilling a wellbore to penetrate a subterranean formation. In certain embodiments, process flow 10 includes drilling a wellbore to penetrate a subterranean formation in which an acidic gas, an acid-containing fluid, or both, are present 11. In certain embodiments, process flow 10 includes circulating a drilling fluid in the wellbore while drilling the wellbore, the drilling fluid including a polymeric swellable acid scavenger that includes at least one polymeric composition 12. In certain embodiments, process flow 10 may also include allowing the polymeric composition to swell upon exposure to at least one acid-containing species in the acidic gas, the acid-containing fluid, or both, to form a swollen polymeric material 13. In certain embodiments, the polymeric composition may swell upon interacting with the acidic gas, the acid-containing fluid, or both. In some embodiments, process flow 10 may include removing the swollen polymeric material 14. In certain embodiments, removing the swollen polymeric material may remove one or more acid-containing species in the acidic gas, the acid-containing fluid, or both.

In certain embodiments, the polymeric swellable acid scavenger may interact with an acid-containing species present in a conduit, container, fluid retention pit, wellbore, or subterranean formation to remove the species. The polymeric swellable acid scavenger may be provided as a powder that may include the polymeric composition. The polymeric swellable acid scavenger powder may be added to a fluid by any means known in the art. In some embodiments, the polymeric swellable acid scavenger may include a polymeric composition that is a glassy polymer. The glassy polymer may be free flowing and/or have strength imparted to it by a monomer and/or comonomer (e.g., styrene). In certain embodiments, this may facilitate dispersion and mixing of the polymeric swellable acid scavenger in a fluid.

The polymeric swellable acid scavenger of the present disclosure may provide an enhanced ability to scavenge acid-containing species as compared to certain other acid scavengers due to an ability to interact with acid-containing species over a wide range of temperatures. In some embodiments, the polymeric swellable acid scavenger may be introduced into a fluid that contains or is expected to contain one or more acid-containing species when the temperature of the fluid or the environment in which the fluid flows or resides is in the range of from about 10° C. (50° F.) to about 180° C. (356° F.), or greater. In certain embodiments, the polymeric swellable acid scavenger may be introduced into a fluid that contains or is expected to contain one or more acid-containing species wherein the temperature of fluid or the environment in which the fluid flows or resides is as low as any of 10, 15, 20, 25, 30, 35, 40, 45, 50, 55, and 60° C. In certain embodiments, the polymeric swellable acid scavenger may be introduced into a fluid that contains or is expected to contain one or more acid-containing species, wherein the temperature of the fluid or the environment in which the fluid flows or resides is as high as any of 120, 125, 130, 135, 140, 145, 150, 155, 160, 165, 170, 175 and 180° C. In certain embodiments, the polymeric swellable acid scavenger may be introduced into a fluid that contains or is expected to contain one or more acid-containing species wherein the temperature of the fluid or the environment in which the fluid flows or resides is in the range of from about 20° C. (50° F.) to about 150° C. (302° F.), in other embodiments, about 20° C. (50° F.) to about 125° C. (257° F.), in other embodiments, about 20° C. (50° F.) to about 100° C. (212° F.), in other embodiments, about 20° C. (50° F.) to about 75° C. (167° F.), in other embodiments, about 20° C. (50° F.) to about 50° C. (122° F.), in other embodiments, about 30° C. (86° F.) to about 100° C. (212° F.), in other embodiments, about 50° C. (122° F.) to about 100° C. (212° F.).

In certain embodiments, the polymeric swellable acid scavenger may be introduced into a fluid to be treated in an amount of from about 0.1% to about 30% by weight of the fluid to be treated. In some embodiments, the polymeric swellable acid scavenger may be introduced into the fluid to be treated in an amount as low as any of: 0.1, 0.50, 1.00, 1.5, 2.00, 2.50, 3.00, 3.50, 4.00, 4.50, 5.00, 5.50, 6.00, 6.50, 7.00, 7.50, 8.00, 8.50, 9.00 , 9.50, 10, 11, 12, 13, 14 and 15.00% by weight of the fluid to be treated. In some embodiments, the polymeric swellable acid scavenger may be introduced into the fluid to be treated in an amount as high as any of: 5.0, 6.0, 7.0, 8.0, 9.0, 10.0, 11.0, 12.0, 13.0, 14.0, 15.0, 16,0, 17.0, 18.0, 19.0, 20.0, 21.0, 22.0, 23.0, 24.0, 25.0, 26.0, 27.0, 28.0, 29.0 and 30.0% by weight of the fluid to be treated. In certain embodiments, the polymeric swellable acid scavenger may be introduced into the fluid to be treated in an amount from about 0.1% to about 15% by weight of the fluid to be treated, in other embodiments, about 0.5% to about 12% by weight of the fluid to be treated, in other embodiments, about 1% to about 10% by weight of the fluid to be treated, in other embodiments, about 5.0% to about 10% by weight of the fluid to be treated.

In certain embodiments, a polymeric swellable acid scavenger may be introduced into and/or contact a fluid that may include any one or more of an aqueous fluid, a gas, a liquid hydrocarbon, an oil-water mixed production fluid, and any combination thereof. In some embodiments, the aqueous fluid may include water, salt water (e.g., water containing one or more salts dissolved therein), brine (e.g., saturated salt water), seawater, or any combination thereof. Although listed separately from liquid hydrocarbon, the gas may include gaseous hydrocarbon, though the gas need not necessarily include hydrocarbon. In some embodiments, the gas may include, but is not limited to oxygen ($O_2$), hydrogen ($H_2$), nitrogen ($N_2$), carbon dioxide ($CO_2$), methane ($CH_4$), hydrogen sulfide ($H_2S$), argon (Ar), krypton (Kr), xenon (Xe), a hydrocarbon, a freon, and any combination thereof. In certain embodiments, the polymeric swellable acid scavenger may be introduced into and/or contact the fluid to be treated through a conduit or an injection point. In certain embodiments, the polymeric swellable acid scavenger of the present disclosure may be introduced into a conduit, container, fluid retention pit, subterranean formation, wellhead, wellbore, and the like and may be introduced into and/or contact a fluid residing therein. In certain embodiments, the fluid to be treated may be flowing or it may be substantially stationary.

In certain embodiments, a polymeric swellable acid scavenger may be added to a fluid before the fluid contains any detectable amount of acid-containing species, for example, in a fluid retention pit before the fluid has circulated. This may be, for example, a prophylactic measure against acid-containing species that the fluid may encounter downhole. In certain embodiments, a polymeric swellable acid scavenger may be added to a fluid in a fluid retention pit after the fluid has circulated. In certain embodiments, a polymeric swellable acid scavenger may be added after the fluid to be treated has been circulating downhole and has already encountered acid-containing species and contains the same. In some embodiments, a polymeric swellable acid scavenger may be dispersed in a fluid and injected directly into a production flowline below a wellhead (e.g., via an injection quill), where it may be used to remove acid-containing species from mixed oil-water production fluids.

In certain embodiments, the amount of a polymeric swellable acid scavenger added to a fluid may be controlled and/or varied during the course of an operation based on, among other things, the amount of acid-containing species detected in a fluid exiting the wellbore. In these embodiments, any system or technique capable of monitoring or detecting the presence or amount of acid-containing species in fluids exiting a wellbore may be used. For example, a hydrogen sulfide ($H_2S$) detector may be used to detect hydrogen sulfide ($H_2S$) gas and carbon dioxide ($CO_2$) may be detected by measuring fluid properties such as rheology, pH, and/or by a titration. Moreover, a polymeric swellable acid scavenger may be added to a fluid to be treated in batches added at separate intervals spaced over a period of time. For example, a first amount of polymeric swellable acid scavenger may be added to a fluid to be treated at one point in time during the course of a particular operation. At a subsequent point during that operation, a second amount (e.g., a higher amount) of acid-containing species may be detected exiting the wellbore. At this point, a second amount of polymeric swellable acid scavenger may be added to the fluid to be treated based, at least in part, on the amount of acid-containing species detected.

In the methods of the present disclosure, the polymeric swellable acid scavenger may be added to, or included in, a treatment fluid in any amount that may effectively eliminate or reduce the concentration of acid-containing species that are present (e.g., as detected in fluids in a subterranean formation or exiting a wellbore), or are expected to be present, by the desired amount in a fluid to be treated. The polymeric swellable acid scavenger may be added to, or included in, the treatment fluid as a powder, which may be a free flowing powder. The powder may be further ground to make very fine particles that may be dispersed in drilling fluid. In certain embodiments, an initial amount of polymeric swellable acid scavenger may be added to a treatment fluid followed by subsequent, additional amounts. This technique may be used to increase and/or maintain a concentration of polymeric swellable acid scavenger that may be sufficient to remove the desired amount of acid-containing species in a fluid to be treated throughout the course of a given operation.

Treatment fluids can be used in a variety of above ground and subterranean treatment operations. As used herein, the terms "treat," "treatment," "treating," and grammatical equivalents thereof refer to any above ground or subterranean operation that uses a fluid in conjunction with achieving a desired function and/or for a desired purpose. Use of these terms does not imply any particular action by the treatment fluid. Illustrative treatment operations can include, for example, surface facilities operations, fracturing operations, gravel packing operations, acidizing operations, scale dissolution and removal, consolidation operations, and the like.

The treatment fluid of the present disclosure may include any carrier fluid known in the art, including an aqueous fluid, a non-aqueous fluid, or any combination thereof. An aqueous fluid that may be suitable for use as a carrier fluid may include water from any source. This may include fresh water, salt water (e.g., water containing one or more salts dissolved therein), brine (e.g., saturated salt water), seawater, or any combination thereof. The aqueous fluid may be from a source that does not contain compounds that adversely affect other components of a fluid. In certain embodiments of the present disclosure, an aqueous fluid may include one or more ionic species, such as those formed by salts dissolved in water. For example, seawater and/or produced water may include a variety of divalent cationic species dissolved therein. In certain embodiments, the density of the aqueous fluid can be adjusted, among other purposes, to provide additional particulate transport and suspension in the treatment fluids of the present disclosure. In certain embodiments, the pH of the aqueous fluid may be adjusted (e.g., by a buffer or other pH adjusting agent) to a specific level, which may depend on, among other factors, the types of viscosifying agents, acids, and other additional additives included in a fluid. One of ordinary skill in the art, with the benefit of this disclosure, will recognize when such density and/or pH adjustments are appropriate. Examples of a non-aqueous fluid that may be suitable for use as a carrier fluid include, but are not limited to an oil, a hydrocarbon, an organic liquid, a mineral oil, a synthetic oil, an ester, or any combination thereof In certain embodiments, a treatment fluid of the present disclosure optionally may include any number of additional additives. Examples of such additional additives include, but are not limited to, salts, surfactants, acids, proppant particulates, diverting agents, fluid loss control additives, gas, nitrogen, carbon dioxide, surface modifying agents, tackifying agents, foamers, corrosion inhibitors, scale inhibitors, catalysts, clay control agents, biocides, friction reducers, antifoam agents, bridging agents, flocculants, additional sulfide scavengers, carbon dioxide scavengers, oxygen scavengers, lubricants, viscosifiers, breakers, weighting agents, relative permeability modifiers, resins, wetting agents, coating enhancement agents, filter cake removal agents, antifreeze agents (e.g., ethylene glycol or polyethylene glycol), or any combination thereof A person skilled in the art, with the benefit of this disclosure, will recognize the types of additional additives that may be included in the fluids of the present disclosure for a particular application.

In certain embodiments, a surfactant may be used together with the polymeric swellable acid scavenger. The surfactant may, among other purposes, help disperse the polymeric swellable acid scavenger and/or other additives in a fluid. A suitable surfactant may include an alkoxylated alkyl alcohol and salts thereof, an alkoxylated alkyl phenol and salts thereof, an alkyl or aryl sulfonate, a sulfate, a phosphate, a carboxylate, a polyoxyalkyl glycol, a fatty alcohol, a polyoxyethylene glycol sorbitan alkyl ester, a sorbitan alkyl ester, a polysorbate, a glucoside, a quaternary amine compound, an amine oxide surfactant, or any combination thereof.

In certain embodiments of the present disclosure, the polymeric swellable acid scavenger, treatment fluids, and/or additional additives of the present disclosure may be introduced into a conduit, container, mud pit, subterranean formation, and/or wellbore penetrating a subterranean formation using any method or equipment known in the art. Introduction of the polymeric swellable acid scavenger, treatment fluids, and/or additional additives of the present disclosure may include delivery via any of a tube, umbilical, pump, gravity, and combinations thereof. The polymeric swellable acid scavenger, treatment fluids, and/or additional additives of the present disclosure may, in various embodiments, be delivered into top-side flowlines, pipelines, surface treating equipment, or downhole (e.g., into the wellbore).

For example, in certain embodiments, the polymeric swellable acid scavenger, treatment fluids, and/or additional additives of the present disclosure may be applied to a subterranean formation and/or wellbore using batch treatments, squeeze treatments, continuous treatments, and/or combinations thereof. In certain embodiments, a batch treatment may be performed in a subterranean formation by stopping production from the well and pumping a certain amount of the polymeric swellable acid scavenger, treatment fluids, and/or additional additives into a wellbore, which may be performed at one or more points in time during the life of a well. In other embodiments, a squeeze treatment may be performed by dissolving the polymeric swellable acid scavenger, treatment fluids, and/or additional additives in a suitable solvent at a suitable concentration and squeezing that solvent carrying the scavenging additive or additional additives downhole into the formation, allowing production out of the formation to bring the polymeric swellable acid scavenger or additional additives to the desired location. In other embodiments, the acid-containing species may be present in a gaseous phase and the polymeric swellable acid scavenger may be injected in a liquid, such that the gaseous phase bubbles through the additives in a tower.

In certain embodiments, the polymeric swellable acid scavenger of the present disclosure may be added to a conduit where one or more fluids enter the conduit at one or more other locations along the length of the conduit. In these embodiments, the polymeric swellable acid scavenger may be added in batches or injected in a liquid substantially continuously while the conduit is being used, for example, to maintain the concentration of the polymeric swellable acid scavenger of the present disclosure in the fluid at a certain amount (e.g., one or more of the amounts referenced above).

In some embodiments, the present disclosure provides methods for using the polymeric swellable acid scavenger, treatment fluids, and/or additional additives to carry out a variety of subterranean treatments, including but not limited to, preflush treatments, afterflush treatments, hydraulic fracturing treatments, acidizing treatments, sand control treatments (e.g., gravel packing), "frac-pack" treatments, wellbore clean-out treatments, drilling operations, and other operations where a treatment fluid may be useful. Such treatment fluids may include, but are not limited to, drilling fluids, preflush fluids, afterflush fluids, fracturing fluids, acidizing fluids, gravel packing fluids, packer fluids, spacer fluids, and the like. In certain embodiments, the methods of the present disclosure may be used to reduce or eliminate concentrations of acidic gases (e.g. hydrogen sulfide and/or carbon dioxide) released to the atmosphere by adding the treatment fluids to fluid retention pits and settling ponds on location proximate the well.

In some embodiments, the polymeric swellable acid scavenger, treatment fluids, and/or additional additives may be used in treating a portion of a subterranean formation, for example, in acidizing treatments such as matrix acidizing or fracture acidizing. In certain embodiments, a treatment fluid including the polymeric swellable acid scavenger may be introduced into a subterranean formation. In some embodiments, the treatment fluid including the polymeric swellable acid scavenger may be introduced into a wellbore that penetrates a subterranean formation. In some embodiments, the treatment fluid including the polymeric swellable acid scavenger may be introduced at a pressure sufficient to create or enhance one or more fractures within the subterranean formation (e.g., hydraulic fracturing).

In still other embodiments, the polymeric swellable acid scavenger, treatment fluids, and/or additional additives of the present disclosure may be injected into a portion of a conduit, container, mud pit, or subterranean formation using an annular space or capillary injection system to continuously introduce the polymeric swellable acid scavenger, treatment fluids, and/or additional additives. Other means and/or equipment that may be used to continuously inject the polymeric swellable acid scavenger, treatment fluids, and/or additional additives of the present disclosure into a wellbore include, but are not limited to slip-stream systems, annulus drip systems, cap strings, umbilical strings, gas lift systems, continuous metering systems, subsurface hydraulic systems, bypass feeders, and the like.

In certain embodiments, such continuous injection equipment at a well site may be controlled from a remote location and/or may be partially or completely automated. In certain embodiments, a treatment fluid including the polymeric swellable acid scavenger of the present disclosure may be circulated in the wellbore using the same types of pumping systems and equipment at the surface that are used to introduce treatment fluids or additives into a wellbore penetrating at least a portion of the subterranean formation.

The treatment fluids disclosed herein may directly or indirectly affect one or more components or pieces of equipment associated with the preparation, delivery, recapture, recycling, reuse, and/or disposal of the treatment fluids of the present disclosure. For example, the methods and compositions of the present disclosure may directly or indirectly affect one or more mixers, related mixing equipment, mud pits, storage facilities or units, composition separators, heat exchangers, sensors, gauges, pumps, compressors, and the like used generate, store, monitor, regulate, and/or recondition the exemplary treatment fluids. The disclosed treatment fluids may also directly or indirectly affect any transport or delivery equipment used to convey the treatment fluids to a well site or downhole such as, for example, any transport vessels, conduits, pipelines, trucks, tubulars, and/or pipes used to compositionally move the treatment fluids from one location to another, any pumps, compressors, or motors (e.g., topside or downhole) used to drive the treatment fluids into motion, any valves or related joints used to regulate the pressure or flow rate of treatment fluids, and any sensors (i.e., pressure and temperature), gauges, and/or combinations thereof, and the like. The treatment fluids of the present disclosure may also directly or indirectly affect the various downhole equipment and tools that may come into contact with the treatment fluids such as, but not limited to, wellbore casing, wellbore liner, completion string, insert strings, drill string, coiled tubing, slickline, wireline, drill pipe, drill collars, mud motors, downhole motors and/or pumps, cement pumps, surface-mounted motors and/or pumps, centralizers, turbolizers, scratchers, floats (e.g., shoes, collars, valves, etc.), wiper balls, wiper darts, pigs, logging tools and related telemetry equipment, actuators (e.g., electromechanical devices, hydromechanical devices, etc.), sliding sleeves, production sleeves, plugs, screens, filters, flow control devices (e.g., inflow control devices, autonomous inflow control devices, outflow control devices, etc.), couplings (e.g., electro-hydraulic wet connect, dry connect, inductive coupler, etc.), control lines (e.g., electrical, fiber optic, hydraulic, etc.), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like. In some embodiments, the treatment fluid is introduced into a wellbore using one or more pumps.

Figure 2:
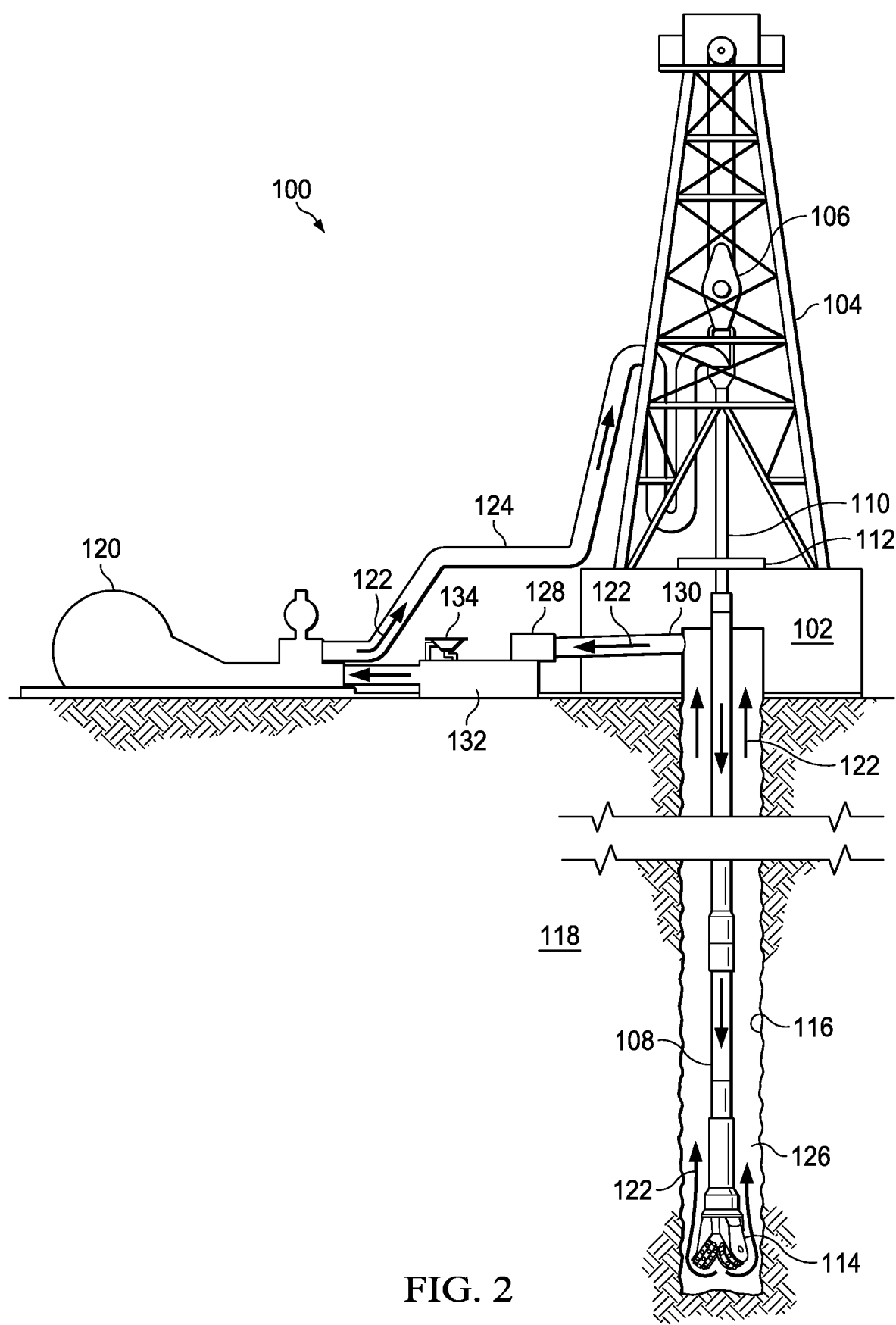
FIG. 2 is a schematic diagram of a wellbore drilling assembly that may be used in accordance with certain embodiments of the present disclosure; and While embodiments of this disclosure have been depicted, such embodiments do not imply a limitation on the disclosure, and no such limitation should be inferred. The subject matter disclosed is capable of considerable modification, alteration, and equivalents in form and function, as will occur to those skilled in the pertinent art and having the benefit of this disclosure. The depicted and described embodiments of this disclosure are examples only, and not exhaustive of the scope of the disclosure.

For example, and with reference to FIG. 2, the treatment fluids of the present disclosure may directly or indirectly affect one or more components or pieces of equipment associated with an exemplary wellbore drilling assembly 100, according to one or more embodiments. It should be noted that while FIG. 2 generally depicts a land-based drilling assembly, those skilled in the art will readily recognize that the principles described herein are equally applicable to subsea drilling operations that employ floating or sea-based platforms and rigs, without departing from the scope of the disclosure.

As illustrated, the drilling assembly 100 may include a drilling platform 102 that supports a derrick 104 having a traveling block 106 for raising and lowering a drill string 108. The drill string 108 may include, but is not limited to, drill pipe and coiled tubing, as generally known to those skilled in the art. A kelly 110 supports the drill string 108 as it is lowered through a rotary table 112. A drill bit 114 is attached to the distal end of the drill string 108 and is driven either by a downhole motor and/or via rotation of the drill string 108 from the well surface. As the bit 114 rotates, it creates a borehole 116 that penetrates various subterranean formations 118.

A pump 120 (e.g., a mud pump) circulates wellbore fluid 122 (e.g., a drilling fluid or a lost circulation pill described herein) through a feed pipe 124 and to the kelly 110, which conveys the wellbore fluid 122 downhole through the interior of the drill string 108 and through one or more orifices in the drill bit 114 (or optionally through a bypass or ports (not shown) along the drill string and above the drill bit 114). The wellbore fluid 122 is then circulated back to the surface via an annulus 126 defined between the drill string 108 and the walls of the borehole 116. At the surface, the recirculated or spent wellbore fluid 122 exits the annulus 126 and may be conveyed to one or more fluid processing unit(s) 128 via an interconnecting flow line 130. After passing through the fluid processing unit(s) 128, a "cleaned" wellbore fluid 122 is deposited into a nearby retention pit 132 (e.g., a mud pit). While illustrated as being arranged at the outlet of the wellbore 116 via the annulus 126, those skilled in the art will readily appreciate that the fluid processing unit(s) 128 may be arranged at any other location in the drilling assembly 100 to facilitate its proper function, without departing from the scope of the scope of the disclosure.

One or more of the disclosed treatment fluids may be added to the wellbore fluid 122 via a mixing hopper 134 communicably coupled to or otherwise in fluid communication with the retention pit 132. The mixing hopper 134 may include, but is not limited to, mixers and related mixing equipment known to those skilled in the art. In other embodiments, however, the treatment fluids of the present disclosure may be added to the wellbore fluid 122 at any other location in the drilling assembly 100. In at least one embodiment, for example, there could be more than one retention pit 132, such as multiple retention pits 132 in series. Moreover, the retention pit 132 may be representative of one or more fluid storage facilities and/or units where the treatment fluids of the present disclosure may be stored, reconditioned, and/or regulated until added to the wellbore fluid 122.

As mentioned above, the treatment fluids of the present disclosure may directly or indirectly affect the components and equipment of the drilling assembly 100. For example, the treatment fluids of the present disclosure may directly or indirectly affect the fluid processing unit(s) 128 which may include, but is not limited to, one or more of a shaker (e.g., shale shaker), a centrifuge, a hydrocyclone, a separator (including magnetic and electrical separators), a desilter, a desander, a separator, a filter (e.g., diatomaceous earth filters), a heat exchanger, any fluid reclamation equipment. The fluid processing unit(s) 128 may further include one or more sensors, gauges, pumps, compressors, and the like used store, monitor, regulate, and/or recondition the exemplary treatment fluids.

The treatment fluids of the present disclosure may directly or indirectly affect the pump 120, which representatively includes any conduits, pipelines, trucks, tubulars, and/or pipes used to fluidically convey the treatment fluids downhole, any pumps, compressors, or motors (e.g., topside or downhole) used to drive the treatment fluids into motion, any valves or related joints used to regulate the pressure or flow rate of the treatment fluids, and any sensors (i.e., pressure, temperature, flow rate, etc.), gauges, and/or combinations thereof, and the like. The treatment fluids of the present disclosure may also directly or indirectly affect the mixing hopper 134 and the retention pit 132 and their assorted variations.

The treatment fluids of the present disclosure may also directly or indirectly affect the various downhole equipment and tools that may come into contact with the treatment fluids such as, but not limited to, the drill string 108, any floats, drill collars, mud motors, downhole motors and/or pumps associated with the drill string 108, and any MWD/LWD tools and related telemetry equipment, sensors or distributed sensors associated with the drill string 108. The treatment fluids of the present disclosure may also directly or indirectly affect any downhole heat exchangers, valves and corresponding actuation devices, tool seals, packers and other wellbore isolation devices or components, and the like associated with the wellbore 116. The treatment fluids of the present disclosure may also directly or indirectly affect the drill bit 114, which may include, but is not limited to, roller cone bits, PDC bits, natural diamond bits, any hole openers, reamers, coring bits, etc.

An embodiment of the present disclosure is a method including introducing a treatment fluid including a polymeric swellable acid scavenger that includes at least one polymeric composition into a wellbore penetrating at least a portion of a subterranean formation in which an acidic gas, an acid-containing fluid, or both, are present.

Another embodiment of the present disclosure is a method including introducing a treatment fluid including a polymeric swellable acid scavenger that includes at least one polymeric composition into at least a portion of a conduit, a container, or a fluid retention pit in which an acidic gas, an acid-containing fluid, or both are present.

Another embodiment of the present disclosure is a method including drilling at least a portion of a wellbore to penetrate at least a portion of a subterranean formation in which an acidic gas, an acid-containing fluid, or both, are present; circulating a drilling fluid in at least the portion of the wellbore while drilling at least the portion of the wellbore, the drilling fluid including a polymeric swellable acid scavenger including at least one polymeric composition; allowing at least a portion of the polymeric composition to swell upon exposure to at least one acid-containing species in the acidic gas, the acid-containing fluid, or both, to form a swollen polymeric material; and removing the swollen polymeric material.

Another embodiment of the present disclosure is a method including introducing a treatment fluid including a polymeric swellable acid scavenger that includes at least one polymeric composition into a wellbore penetrating at least a portion of a subterranean formation in which an acidic gas, an acid-containing fluid, or both, are present, wherein the polymeric composition includes at least one monomer and at least one crosslinker. Optionally in this embodiment or any other embodiment disclosed herein, the monomer has the chemical formula:

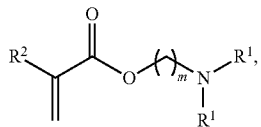

wherein: each $R^1$ is independently a $C_1$-$C_{10}$ alkyl; $R^2$ is a substituted or unsubstituted linear, branched, cyclic, heterocyclic, or aromatic hydrocarbyl group; and m is an integral in a range from 1 to 5. Optionally in this embodiment or any other embodiment of the present disclosure, the crosslinker has the chemical formula:

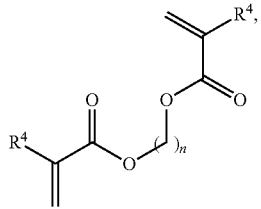

wherein: each $R^4$ is independently a substituted or unsubstituted linear, branched, cyclic, heterocyclic, or aromatic hydrocarbyl group, and n is an integral in a range from 1 to 5. Optionally in this embodiment or any other embodiment of the present disclosure, the polymeric composition is produced by reacting the monomer, the crosslinker, and a radical initiator. Optionally in this embodiment or any other embodiment of the present disclosure, the polymeric composition further includes at least one comonomer. Optionally in this embodiment or any other embodiment of the present disclosure, the comonomer has the chemical formula: $R^3$–CH=CH$_2$; wherein $R^3$ is a substituted or unsubstituted linear, branched, cyclic, heterocyclic, or aromatic hydrocarbyl group. Optionally in this embodiment or any other embodiment of the present disclosure, the polymeric composition is produced by reacting the monomer, the comonomer, the crosslinker, and a radical initiator. Optionally in this embodiment or any other embodiment of the present disclosure, the acidic gas, the acid-containing fluid, or both, include an acid-containing species that is selected from the group consisting of: carbon dioxide ($CO_2$), carbonic acid ($H_2CO_3$), hydrogen sulfide ($H_2S$) and any combination thereof. Optionally in this embodiment or any other embodiment of the present disclosure, the polymeric swellable acid scavenger includes a single polymeric composition. Optionally in this embodiment or any other embodiment of the present disclosure, the acidic gas includes carbon dioxide ($CO_2$) and hydrogen sulfide ($H_2S$), and the acid-containing fluid includes carbonic acid ($H_2CO_3$) and hydrogen sulfide ($H_2S$). Optionally in this embodiment or any other embodiment of the present disclosure, the method further includes allowing at least a portion of the polymeric composition to swell upon exposure to the carbon dioxide ($CO_2$) and hydrogen sulfide ($H_2S$) in the acidic gas, the carbonic acid ($H_2CO_3$) and hydrogen sulfide ($H_2S$) in the acid-containing fluid, or both, to form a swollen polymeric material; and removing the swollen polymeric material, wherein removing the swollen polymeric material removes the carbon dioxide ($CO_2$) and hydrogen sulfide ($H_2S$) from the acidic gas, the carbonic acid ($H_2CO_3$) and hydrogen sulfide ($H_2S$) from the acid-containing fluid, or both. Optionally in this embodiment or any other embodiment of the present disclosure, the acid-containing fluid includes at least one component selected from the group consisting of: water, salt water, brine, seawater, a gas, a liquid hydrocarbon, an oil-water mixed production fluid, and any combination thereof.

Another embodiment of the present disclosure is a method including introducing a treatment fluid including a polymeric swellable acid scavenger that includes at least one polymeric composition into at least a portion of a conduit, a container, or a fluid retention pit in which an acidic gas, an acid-containing fluid, or both are present, wherein the acidic gas includes carbon dioxide ($CO_2$) and hydrogen sulfide ($H_2S$), and the acid-containing fluid includes carbonic acid ($H_2CO_3$) and hydrogen sulfide ($H_2S$).

Another embodiment of the present disclosure is a method including drilling at least a portion of a wellbore to penetrate at least a portion of a subterranean formation in which an acidic gas, an acid-containing fluid, or both, are present; circulating a drilling fluid in at least the portion of the wellbore while drilling at least the portion of the wellbore, the drilling fluid including a polymeric swellable acid scavenger including at least one polymeric composition; allowing at least a portion of the polymeric composition to swell upon exposure to at least one acid-containing species in the acidic gas, the acid-containing fluid, or both, to form a swollen polymeric material; and removing the swollen polymeric material, wherein the polymeric composition includes at least one monomer, and at least one crosslinker. Optionally in this embodiment or any other embodiment of the present disclosure, the polymeric composition further includes at least one comonomer. Optionally in this embodiment or any other embodiment of the present disclosure, the acid-containing species is selected from the group consisting of: carbon dioxide ($CO_2$), carbonic acid ($H_2CO_3$), hydrogen sulfide ($H_2S$) and any combination thereof. Optionally in this embodiment or any other embodiment of the present disclosure, the drilling fluid includes at least one component selected from the group consisting of: water, salt water, brine, seawater, a gas, a liquid hydrocarbon, an oil-water mixed production fluid, and any combination thereof.

To facilitate a better understanding of the present disclosure, the following examples of certain aspects of certain embodiments are given. The following examples are not the only examples that could be given according to the present disclosure and are not intended to limit the scope of the disclosure or claims.

EXAMPLES

The following examples demonstrate the synthesis of polymeric compositions and laboratory tests conducted to evaluate the scavenging ability of the polymeric swellable acid scavengers including the polymeric compositions according to some embodiments of the present disclosure.

EXAMPLE 1

In this example, two polymeric compositions, polymer I and polymer II, were synthesized.

For polymer I, about 98 mol % of N,N-dimethylaminoethyl methacrylate (DMAEMA) and about 2 mol% of ethylene glycol dimethacrylate (EGDMA) were mixed together in a reaction vessel until combined. DMAEMA includes an amine functional group that may interact with carbonic acid ($H_2CO_3$) and/or hydrogen sulfide ($H_2S$).

For polymer II, about about 78 mol % of DMAEMA, about 2 mol % of EGDMA, and about 20 mol % of styrene were mixed together in a reaction vessel until combined.

For both polymer I and polymer II, about 1 mol % (based on total moles of DMAEMA, styrene, and EGDMA) of azobisisobutyronitrile (AIBN) was added to the mixture in the reaction vessel. The mixture was purged with nitrogen gas for about 15 minutes and then the reaction vessel containing the mixture was sealed. The reaction vessel was heated at a temperature of about 158° F. (about 70° C.) for about 20 hours to form a cross-linked, crude polymeric product. Thereafter, the crude polymeric product was repeatedly washed with about 200 mL of methanol three times to remove unreacted reagents and byproducts. The purified polymeric product was a white, free flowing powder which was ground to make very fine particles. The total yield was about 95 wt. %.

EXAMPLE 2

In this example, the interaction of the polymeric compositions polymer I and polymer II (synthesized as in Example 1) with carbon dioxide ($CO_2$) gas in tap water was tested. About 1 g of polymer I or polymer II was combined with about 20 mL of tap water (pH of approximately 7.2) in a container. The mixture was exposed to a stream of carbon dioxide gas by purging the container with carbon dioxide ($CO_2$) at a pressure of about 700 psi at room temperature (about 23° C. or 73° F.) for about 4 hrs. Polymer swelling was observed indicating the interaction of $CO_2$ gas with the polymeric composition.

EXAMPLE 3

In this example, the interaction of the polymeric composition polymer II (synthesized as in Example 1) with carbon dioxide ($CO_2$) gas in alkaline water was tested. About 1 g of polymer II was combined with about 20 mL of water (pH of approximately 10) in a container. The mixture was exposed to a stream of carbon dioxide gas by purging the container with carbon dioxide ($CO_2$) at a pressure of about 700 psi at room temperature (about 23° C. or 73° F.) for about 4 hrs. Polymer swelling was observed indicating the interaction of $CO_2$ gas with the polymeric composition in an alkaline environment.

EXAMPLE 4

In this example, the interaction of polymer II (synthesized as in Example 1) with carbon dioxide ($CO_2$) gas in water-based drilling fluid (pH of approximately 8.5 to 10.5 and including a viscosifier, fluid loss control agent and weighting material) was tested. About 1 g of polymer II was dispersed in about 20 mL of preformed drilling fluid in a container. The mixture was exposed to a stream of carbon dioxide gas by purging the container with carbon dioxide ($CO_2$) at a pressure of about 1000 psi at a temperature of about 66° C. (about 150° F.) for about 4 hrs. Swelling was observed for polymer II indicating the interaction of $CO_2$ gas with the polymeric composition in drilling fluid. The swollen polymeric material was observed to float on top of the fluid and could be separated using a sieve.

EXAMPLE 5

In this example, the interaction of the polymeric compositions polymer I and polymer II (synthesized as in Example 1) with hydrogen sulfide ($H_2S$) was tested. About 4.5 mL of sodium sulfide ($Na_2S$) solution (4.58 g/L) was added to 10 mL $H_2SO_4$ solution (0.02 N) to generate hydrogen sulfide ($H_2S$) according to the following equation:

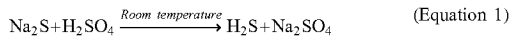

$$Na_2S + H_2SO_4 \xrightarrow{Room\ temperature} H_2S + Na_2SO_4 \quad \text{(Equation 1)}$$

This reaction mixture was used as a test solution. The pH of the test solution was above about 7. About 1 g of polymer I or polymer II was combined with 10 mL of the test solution in a container. The mixture was maintained at room temperature (about 23° C. or 73° F.) for about 17 hrs. A control solution with no polymeric composition added was maintained under the same conditions.

Swelling was observed for both polymer I and polymer II indicating the interaction of $H_2S$ gas with the polymeric composition to form a swollen polymeric material. The swollen polymeric material was separated from the test solution and the % swelling measured as the difference between the initial weight of the polymeric composition and the weight of the swollen polymeric material after interacting with $H_2S$ gas. The % of hydrogen sulfide ($H_2S$) remaining in the separated test solution was measured compared to the control solution using Garrett Gas Train apparatus (Fann Instrument Company, Texas, US). The pH of the separated test solution was measured compared to the control solution using a calibrated pH meter. The results of these measurements are shown in Table 1.

TABLE 1

Results of hydrogen sulfide ($H_2S$) tests on polymeric compositions

| Solution | % swelling of polymeric composition | pH | % $H_2S$ remaining in solution measured using Garrett Gas Train |
|---|---|---|---|
| $Na_2S$ (4.58 g/L) | — | 12.92 | |
| Control ($Na_2S$ + $H_2SO_4$) | — | 7.41 | 100 |

TABLE 1-continued

Results of hydrogen sulfide (H$_2$S) tests on polymeric compositions

| Solution | % swelling of polymeric composition | pH | % H$_2$S remaining in solution measured using Garrett Gas Train |
|---|---|---|---|
| Test (control + polymer I) | 349 | 9.01 | <10 |
| Test (control + polymer II) | 58 | 8.42 | 33 |

The results of the Garrett Gas Train measurements demonstrate that a substantial amount of H$_2$S from the test solution is chemically absorbed by polymer I (>90%) and polymer II (approximately 67%). The increased interaction of polymer I compared to polymer II with H$_2$S demonstrates that the amount of monomer and/or comonomer in the polymeric composition may be tuned to achieve a particular hydrogen sulfide (H$_2$S) scavenging capacity, which may depend on the extent of contamination in an acid-containing fluid. In addition, the amount of polymeric composition added to the acid-containing fluid may be increased, inter alia, to achieve a higher scavenging effect.

Polymer swelling was observed indicating the interaction of H$_2$S gas with the polymeric composition. Polymer I swelled by more than 300% and polymer II swelled up to 58% in the presence of the test solution. The pH of the test solution also increased from 7.4 to 9.0 in presence of polymer I and from 7.4 to 8.4 in presence of polymer II, demonstrating that the polymeric compositions are interacting with their ions present in the solution.

These results demonstrate that the polymeric compositions may be useful in treating hydrogen sulfide (H$_2$S) contamination as well as maintaining the pH of the drilling fluid.

Therefore, the present disclosure is well adapted to attain the ends and advantages mentioned as well as those that are inherent therein. The particular embodiments disclosed above are illustrative only, as the present disclosure may be modified and practiced in different but equivalent manners apparent to those skilled in the art having the benefit of the teachings herein. While numerous changes may be made by those skilled in the art, such changes are encompassed within the spirit of the subject matter defined by the appended claims. Furthermore, no limitations are intended to the details of construction or design herein shown, other than as described in the claims below. It is therefore evident that the particular illustrative embodiments disclosed above may be altered or modified and all such variations are considered within the scope and spirit of the present disclosure. In particular, every range of values (e.g., "from about a to about b," or, equivalently, "from approximately a to b," or, equivalently, "from approximately a-b") disclosed herein is to be understood as referring to the power set (the set of all subsets) of the respective range of values. The terms in the claims have their plain, ordinary meaning unless otherwise explicitly and clearly defined by the patentee.

What is claimed is:

1. A method comprising:
   introducing a treatment fluid into a wellbore, the treatment fluid comprising a polymeric swellable acid scavenger that comprises at least one polymeric composition, the wellbore extending into a subterranean formation in which acid-containing fluid is present;
   contacting the acid-containing fluid with the at least one polymeric composition;
   reducing acid in the acid-containing fluid by forming a swollen polymeric material in the wellbore due to contact between the at least one polymeric composition with the acid-containing fluid; and
   removing the swollen polymeric material from the wellbore along with recovered treatment fluid.

2. The method of claim 1, wherein the polymeric composition comprises at least one monomer and at least one crosslinker.

3. The method of claim 2, wherein the monomer has the chemical formula:

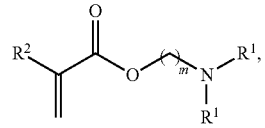

wherein:
each R$^i$ is independently a C$_1$-C$_{10}$ alkyl;
R$^2$ is a substituted or unsubstituted linear, branched, cyclic, heterocyclic, or aromatic hydrocarbyl group; and
m is an integral in a range from 1 to 5.

4. The method of claim 2, wherein the crosslinker has the chemical formula:

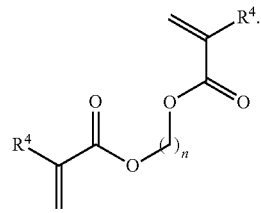

wherein:
each R$^4$ is independently a substituted or unsubstituted linear, branched, cyclic, heterocyclic, or aromatic hydrocarbyl group, and n is an integral in a range from 1 to 5.

5. The method of claim 2, wherein the polymeric composition is produced by reacting the monomer, the crosslinker, and a radical initiator.

6. The method of claim 2, wherein the polymeric composition further comprises at least one comonomer.

7. The method of claim 6, wherein the comonomer has the chemical formula:
R$^3$–CH=CH$_2$; wherein R$^3$ is a substituted or unsubstituted linear, branched, cyclic, heterocyclic, or aromatic hydrocarbyl group.

8. The method of claim 6, wherein the polymeric composition is produced by reacting the monomer, the comonomer, the crosslinker, and a radical initiator.

9. The method of claim 1, wherein the acidic gas, the acid-containing fluid, or both comprise an acid-containing species that is selected from the group consisting of: carbon dioxide (CO$_2$), carbonic acid (H$_2$CO$_3$), hydrogen sulfide (H$_2$S), and any combination thereof.

10. The method of claim 1, wherein the polymeric swellable acid scavenger comprises a single polymeric composition.

11. The method of claim 1, wherein the acidic gas comprises carbon dioxide (CO$_2$) and hydrogen sulfide ($H_2S$), and the acid-containing fluid comprises carbonic acid ($H_2CO_3$) and hydrogen sulfide ($H_2S$).

12. The method of claim 11, further comprising passing the swollen polymeric material through a shale shaker.

13. The method of claim 1, wherein the acid-containing fluid comprises at least one component selected from the group consisting of: water, salt water, brine, seawater, a gas, a liquid hydrocarbon, an oil-water mixed production fluid, and any combination thereof.

14. The method of claim 6, wherein the monomer, comonomer, and crosslinker are each present in the treatment fluid in an amount of about 50 mol % to about 99 mol %, 5 mol % to about 50 mol %, and about 0.1 mol % to about 15 mol % respectively, based on a total number of moles of the monomer, the comonomer, and the crosslinker.

15. The method of claim 5, wherein the reacting comprises combining the radical initiator with the monomer and the crosslinker in an amount of about 0.1 mol% to about 5 mol% based on a total number of moles of the monomer and the crosslinker.

16. The method of claim 1, further comprising passing the swollen polymeric material through a fluid processing unit.

17. The method of claim 1, wherein the recovered treatment fluid includes cuttings from the wellbore.

18. The method of claim 17, further comprising directing the swollen polymeric material to a mud pit from the wellbore.

19. The method of claim 1, wherein the polymeric swellable acid scavenger is introduced into a mud pit.

20. The method of claim 1, wherein the polymeric swellable acid scavenger is introduced into a conduit.

\* \* \* \* \*